United States Patent [19]

Shen

[11] Patent Number: 4,732,192

[45] Date of Patent: Mar. 22, 1988

[54] MECHANISM FOR WATER SUPPLY DEVICE

[76] Inventor: Chung-Shan Shen, No. 34, Ho-Ping Road, Hu Wei, Yunlin Hsien, Taiwan

[21] Appl. No.: 803,647

[22] Filed: Dec. 2, 1985

[51] Int. Cl.[4] .............................................. F16L 37/28
[52] U.S. Cl. ............................... 137/614.19; 137/901; 251/149.4; 251/273; 251/339
[58] Field of Search .......................... 137/614.19, 901; 251/149.4, 273, 339

[56] References Cited

U.S. PATENT DOCUMENTS

| | | | |
|---|---|---|---|
| 576,068 | 1/1897 | O'Lally | 251/339 X |
| 926,627 | 6/1909 | Van Nostran | 251/273 |
| 1,903,605 | 4/1933 | Allen | 137/901 X |
| 3,339,883 | 9/1967 | Drake | 251/149.4 |
| 3,356,335 | 12/1967 | Koch et al. | 251/273 X |
| 4,456,222 | 6/1984 | Shen | 251/339 X |

FOREIGN PATENT DOCUMENTS

| | | | |
|---|---|---|---|
| 546074 | 3/1956 | Belgium | 251/149.4 |
| 496651 | 11/1919 | France | 251/149.4 |
| 461536 | 6/1951 | Italy | 251/273 |
| 7864 | of 1988 | United Kingdom | 251/149.4 |

*Primary Examiner*—A. Michael Chambers
*Assistant Examiner*—John C. Fox

[57] ABSTRACT

A normal directional flowing type water supply device comprising: a connector in a form of short pipe with threads at both ends, a leading hole and a ball with a diameter slightly larger than that of the leading hole in it, to be connected to a water supply pipe, and stops water outlet by means of the ball which can seal the leading hole by water pressure over it; the normal directional flowing faucet has an inlet path and an outlet path below the inlet path, a push rod in the inlet path for extending to the aforesaid water stopper to push away the ball so that water can flow into the inlet path, and a knob between the inlet and outlet paths to control opening and closing of the leading hole by rising and lowering a valve rod; and the instant opener, which is to be connected to outlet of the faucet, has a ball in it to control opening and closing of its leading hole, and a push rod to push the ball aside in order to open the leading hole for outflowing of water.

1 Claim, 6 Drawing Figures

MECHANISM FOR WATER SUPPLY DEVICE

BACKGROUND OF THE INVENTION

This invention relates to a water stopper/supplier, particularly to a water valve which controls the water flow by means of the water pressure of normal directional water flowing.

As everybody knows, it is necessary to turn off the water source first for many purposes, such as repairing or installation of faucet. Otherwise, water will flow out from the source continuously. It is not only a waste of water but also an obstacle to the repairing or installation of faucet. However, if the water source has been turned off, all of the other faucets become useless. Furthermore, all conventional faucets apply torque to compress the elastic gaskets tightly in order to prevent from flowing out of water with opposite pressure. Therefore, a considerable force is required. Thread and gasket of contractible stem may be damaged easily. Since the stem is rotated following the turning of handle, leakage proof ring on the stem may wear away and cause water leakage. Moreover, the water flows out from faucets is used for cleaning dirty articles. But it usually happens that in washing hands, the handle of of the water faucet is turned on by dirty hands and turned off by clean hands. Because before washing, most of the hands are uncleaned, therefore, the dirt will adhere to the handle when turning on the faucet. After the hands have been cleaned by water, the handle of the faucet has to be turned off by hand. The dirt on the handle will as a result be deposited on the hands so as to render them unclean. It is an unhealthy practice, particularly in the public toilet.

Many years ago, there appeared a kind of water faucet which was designed to have an operating lever which was pushed upward for controlling water flow. A spring was used to drive the operating lever and a washer on the lever usually is employed to stop the water outflow. If the operating lever was pushed upward, its washer would be moved away from the water outlet and allow the water to flow out. Such flow did not stop till the external force was released from the operating lever. Although the said water faucet can eliminate the disadvantages arising from the conventional ones, it is still inconvenient due to the fact that a hand must keep applying force to the operating lever so as to maintain water flow continuously.

Furthermore, as conventional water faucets are operated by turning the handles, their washers can be easily deformed. Deformation or other damages due to bearing external forces thus would greatly shorten their service life.

SUMMARY OF THE INVENTION

It is an object of the present invention to provide a new mechanism for water valves, which is a normal directional flowing type and comprising: a connector, a normal directional flowing faucet and an instant opener An operating lever in the instant opener is used to control its operation. When the operating lever is pushed upward, the water valve will be turned on and kept in such condition. To stop the water flowing, the operating lever is pushed horizontally and let go to revert to the condition of turning the water faucet off. Unlike conventional water faucets which requires applying force continuously to push the operating lever upward for water service, the operating lever of the present invention can be kept in the on position, so it facilitates the operation.

The connector of the present invention having one end connected to an ordinary water pipe from water source and another end to a faucet, so that, no water can flow out before connection of faucet or the faucet is not in use, and then, no waste of water will happen, and repair of faucet can be carried out conveniently. This is the second object of the present invention.

The normal directional flowing faucet of the present invention applies an elastic valve body on a rod to control water outlet and a knob to control the vertical movement of the valve body. Thus, it can minimize the possibility of wearing of valve part as usually happened in the conventional faucet, prolong its service life, and can still meet the common habit of using knob type faucet. This is the third object of the present invention.

The normal directional closing type water valve of the present invention is composed of very simple parts and all of which will not be deformed or damaged by the action of external forces, so that its service life will be prolonged. This is the fourth object of the present invention.

A more complete understanding of these and other features and advantages of the present invention will become apparent from a careful consideration of the following detailed description of certain embodiments illustrated in the accompanying drawings.

DETAILED DESCRIPTION OF THE PREFERRED EMBODIMENT

Figure 1:
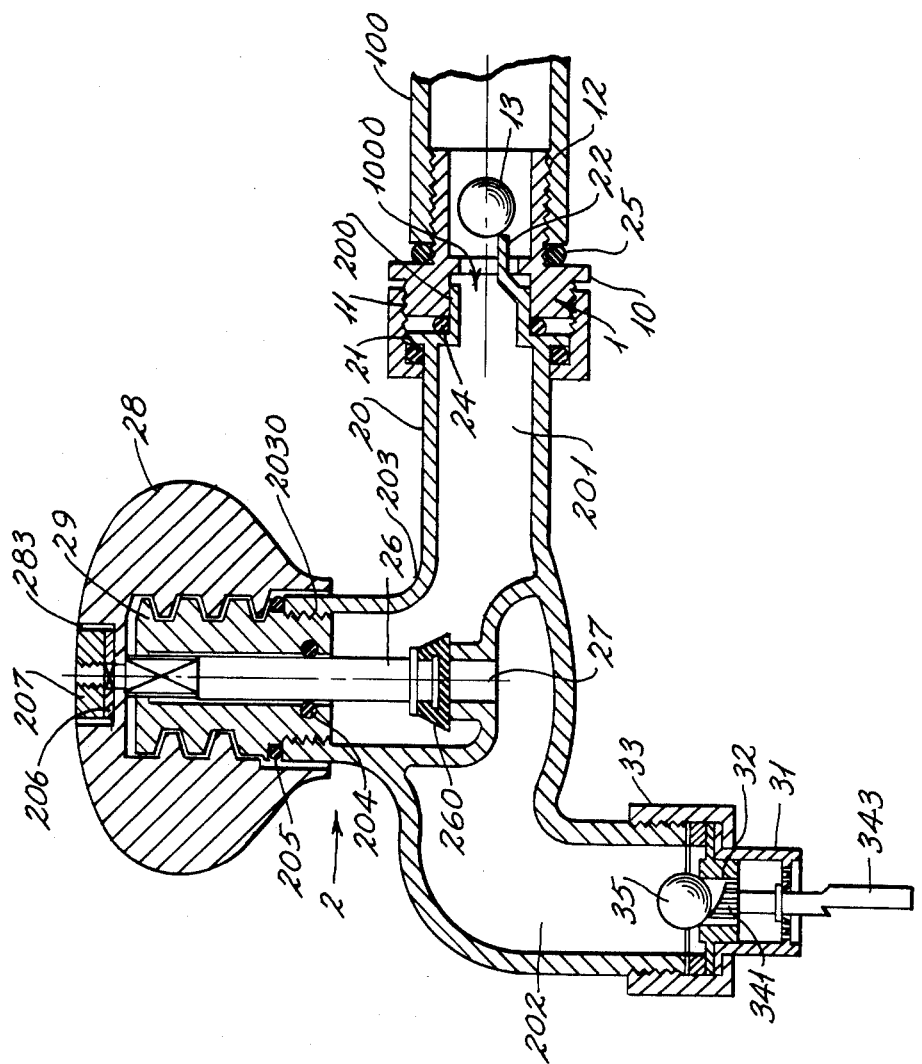
FIG. 1 is a longitudinal cross sectional view of the whole embodiment of the present invention.
Figure 2:
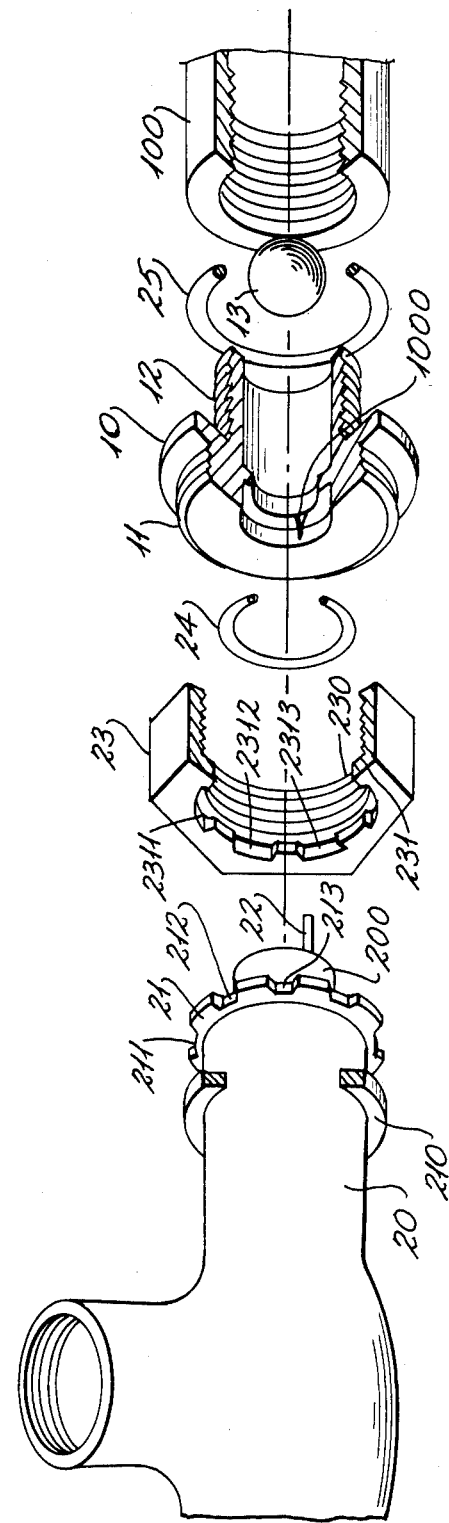
FIG. 2 shows the individual parts of the connector and inlet pipe of faucet of the present invention.

As shown in FIGS. 1 and 2, the water valve of the present invention includes a connector 1, a normal directional flow faucet 2, and an instant opener 3. Wherein, the connector 1 connecting to an ordinary water pipe 100. It is a short pipe which can stop the normal water outlet from the water pipe 100. There are threads on its surface The threads are divided into two sections—front section 11 and rear section 12. There is a flange 10 between these sections 11 and 12. The connector 1 has a bottleneck near its front end to form a leading hole 1000. Behind the leading hole 1000 there is a ball 13 with a diameter slightly larger than that of the leading hole 1000. As soon as the connector 1 is connected to the water pipe 100 with its rear thread section 12, the water flow from the water pipe 100 will push the ball 13 outwards. Then, by means of water pressure, the ball 13 seals the leading hole 1000, and thus, even no faucet has been connected, water will not flow out from the pipe 100. However, if a rod is inserted from the front end of the connector 1 to push the ball 13 through the leading hole 1000, the leading hole will be opened and water flows out.

For connecting the connector 1, the faucet 2 must have an inlet pipe with a flange 21 at its rear end. Surrounding the flange 21 there are a plurality of recessions 211, 212. The inlet pipe 200 behind the flange 21 has an inner diameter corresponding to the size of the connector 1, and has a push rod 22 extending toward its rear end. The connector 1 and the inlet pipe 20 of the faucet 2 are connected together by means of a sleeve 23. The sleeve 23 has thread 230 on its inner wall, and a flange 231 at its front end. The flange 231 also has a plurality of recessions 2311, 2312, 2313, 2314 and so in a shape and number corresponding to that around the flange 21 of the inlet pipe 20 so that the sleeve 23 can pass the flange 21 and then be positioned on the rear end of the inlet pipe 20. On the inlet pipe 20 and between the flanges 231 and 21, there is a elastic washer 210. By pulling the sleeve 23 backwards, the sleeve 23 keeps contacting with the flange 21 of the inlet pipe via the elastic washer 210 so that the sleeve 23 is unable to be moved. The other end of the sleeve 23 is connected to the connector 1 by means of the threads 11 so that the inlet pipe 200 of the faucet 2 is extending into the connector 1 with its push rod 22 inserting into the leading hole 1000 of the connector 1. At the same time, the push rod 22 is pushing the ball 13 so that the ball will no longer seal the leading hole 1000, and water from the water pipe then flows into the faucet 2. The connection of these components are shown in FIG. 1. For the purpose of leakage proof, the leakage proof gaskets 24 and 25 may be installed in a manner as shown in FIG. 1.

Again referring to FIG. 1, the present invention uses a normal directional flowing faucet 2. It has a inlet path 201 and an outlet path 202, batween the inlet path 201 and the outlet path 202, there is a leading hole 27 controlled by a valve rod 26. The valve rod 26, a knob 28 and a shaft tube 29 for an opening and closing controller then set up the important part of the normal directional flowing faucet 2.

Figure 3:
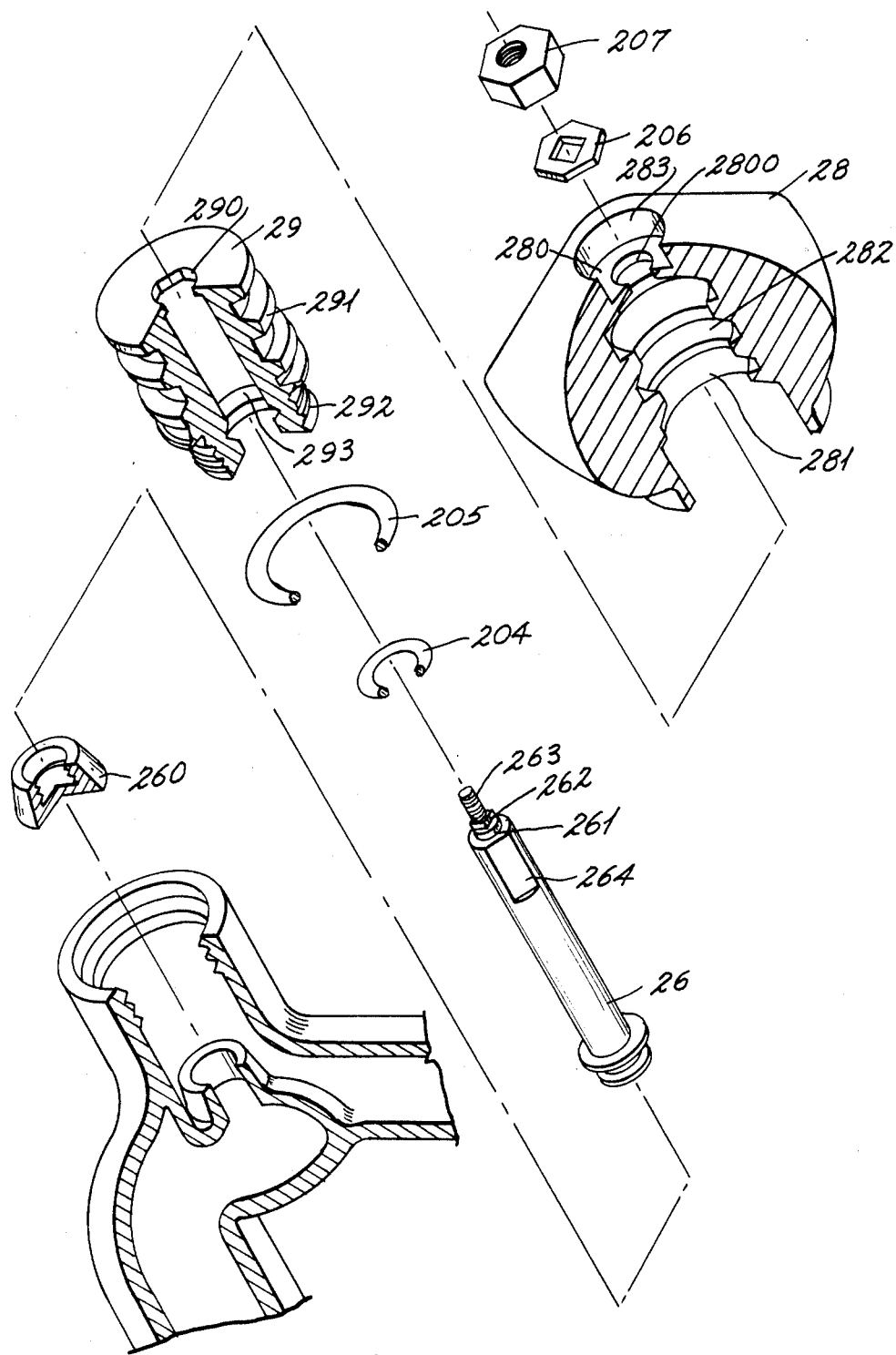
FIG. 3 shows the individual parts of the normal directional flowing faucet and its valve rod of the present invention.

As shown in FIG. 3, the valve rod 26 is a cylindrical rod with its lower end connecting to a water stopper 260 for sealing the upper part of the leading hole 27. Its upper part forms two opposite flat surfaces 264 and a column 261. Above the column 261 there is a rectangular post 262 , and above the rectangular post 262 is a threaded rod 263.

The position of the valve rod 26 can be adjusted by rotating a knob 28 connecting to the upper end of the valve rod 26. The knob 28 has a shaft hole at its center. The shaft hole has a smooth surface on its lower section 281, a threaded surface on its intermediate section 282 and cylindrical recession 283 on its top section. The bottom wall 280 of the cylindrical recession 283 then has a round hole 2800 corresponding to the column 261 of the valve rod 26.

Between the knob 28 and the valve rod 26, is a shaft tube 29, the shaft tube 29 is a hollow tube with threaded surface 291 on the upper half section corresponding to the threaded surface on section 282 of the knob 28 so that the shaft tube 29 can be turned into the knob 28. The lower half section of the shaft tube 29 has a diameter smaller than that of the upper half section and has thread 292 on it. It has a circle of groove 293 around its inner wall near its bottom end. The upper opening 290 of the hollow of the shaft tube 29 has a shape corresponding to the flat surfaces 264 of the valve rod 26.

The assembly of the aforesaid parts is shown in FIG. 1. The vertical pipe 203 of the faucet 2 is with inner thread 2030. The valve rod 26 is first put into the shaft tube 29, a leakage proof gasket 204 is placed within the inner circle groove 293 of the shaft tube 29. Then, the lower section of the shaft tube is screwed into the vertical pipe 203 of the faucet 2. Between them, a leakage proof gasket 205 is placed, as shown in FIG. 1. Then, the knob 28 is screwed onto the shaft tube 29 in a manner that the column section 261 of the valve rod 26 is positioned in the round hole 2832 at the top part of the knob 28, thus exposing the rectangular post 262 and the thread rod 263 in the cylindrical recession 283. The rectangular post 262 then is surrounded by a sleeve element 206 with corresponding rectangular hole and the threaded rod 263 is fasten by a nut 207. The valve rod 26, the knob 28 and the shaft tube 29 thus are fasted together.

In operation, turning of the knob 28 can rise the valve rod 26 and then leading hole 27 is opened, water from the inlet path 201 flows to the external through the leading holes 27 and outlet path 202. The leakage proof gaskets 204 and 205 ensure that no water will leak out from the knob 28.

Figure 4A:
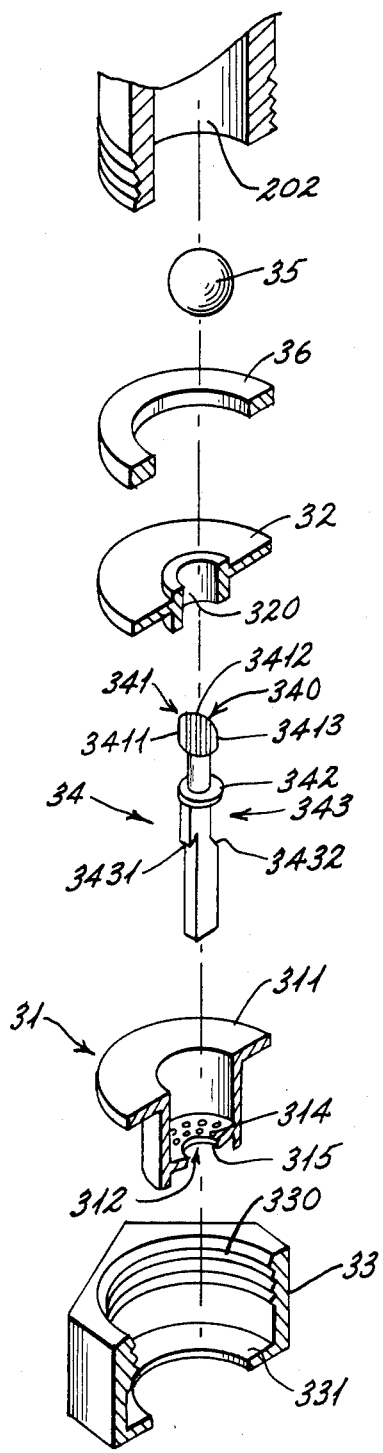
FIGS. 4A–4C show the individual parts of an instant opener and outlet pipe of the faucet of the present invention.

As shown in FIGS. 1 and 4, the present invention also has an instant opener to be installed at the outlet of any ordinary faucet or other similar mechanism. It comprises an outlet pipe 31, an outlet cover 32, a holder 33, an operating lever 34 and a ball 35.

Figure 4B:
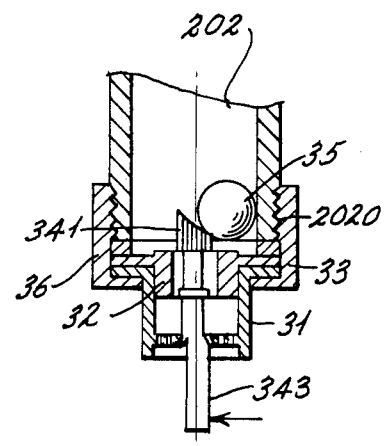
Figure 4C:
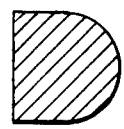

The operating lever 34 has a cylindrical or like colunm 341 with an oblique top 340 at its upper end. On the outer wall of the column 341, there are a plurality of water passing grooves 3411, 3412. The operating lever 34 has a flange 343 in its middle section. The operating lever under the bottom of the flange 342 has a cross section as shown in FIG. 4C to form a column 343 in a shape of rectangle at one half and a shape of ellipse at the other half. The section of the operating lever also forms a hook section 3431 at one side surface and a guide slope 3432 at the other side so that the column 343 is slightly bent.

The outlet pipe 31 has a flange 311 on its top surface and a plurality of holes 315 at its bottom. At the center of the bottom there is a hole 312 for passing of the operating lever 34. The hole 312 has a hooked slot 313 corresponding to the hook section 3431 on the push rod 34, and a oblique wall 314 corresponding to the guide slope 3432 in a shape as shown in FIG. 1. Then, the section 343 of the operating lever 34 can slide freely but is not rotatable within the hole . THe holder 33 is in pipe shaped with a flange 331 inside the holder at its lower end, on the inner wall also formed thread 330.

In assembly of the instant opener 3, threads 2020 are first made around the lower section of the outlet path 202 of the faucet 2, and the ball 35 is first placed within the outlet path 202, on which put a leakage proof gasket 36. Beneath the leakage proof gasket, the outlet cover 32 with a leading hole 320 at its center is installed. The inner diameter of the leading hole 320 is large enough to contain the column 341 on the top of the operating lever 34. The outlet pipe 31 is tightly connected to the bottom of the outlet cover 32. The central hole 312 of the outlet pipe 31 is penetrated with the operating lever 34. The holder 33 with thread 330 on its inner wall and flange 331 at its bottom is connected to the outlet path thread 2020 of the faucet ot form an instant opener 3 as shown in FIG. 1.

In operation, before the operating lever 34 is pushed upwards, the ball 35 is sealing the leading hole 320 at the outlet cover 32 because of water pressure so that the faucet is closed. As soon as the operating lever 34 is pushed upwards, the operating lever pushes the ball 35 to oneside with its column 341, the section 343 of the operating lever 34 slides along the hole 312 of the outlet pipe 31, and then, because of the guide slope 3432, the lever declines towards another side, and the hook section 3431 is held by the hooked slot 313 of the outlet pipe 31 as soon as the pushing force is released. So, the operating lever 34 maintains its position as shown in FIG. 4B, and water can flow from the outlet path 202 via the leading hole 320 of the outlet cover 32 and flow to the external via the multi-holed bottom of the outlet pipe 320. As soon as the operating lever 34 is being pushed in a horizonal direction, the hook section 3431 is disengaged from the hooked slot 313, and the operating lever 34 falls to a position as shown in FIG. 1 after the pushing force is released. Then, the ball 35 seals the leading hole 312 again and stops the water flow because of water pressure.

The present invention is a normal direction closing type water supply device comprising a connector, a normal directional flowing faucet and an instant opener assembled in a form as illustrated in FIG. 1. Furthermore, its components can be used separately. It is clear that numerous modifications and changes within the ability of those skilled in the art without the exercise of the invention faculty can be made without departing from the spirit and disclosed concepts of the present invention as particularly pointed out and defined in the appended claims.

I claim:

1. An apparatus for controlling the flow of water comprising:

a faucet having an inlet path and an outlet path below the inlet path, a leading hole being disposed between the two paths, a cylindrical valve rod with the lower end thereof connecting to a water stopper being used to seal the leading hole, the upper end of the valve rod being connected to a knob, a shaft tube having the lower part thereof screwed into the upper section of the faucet body being disposed between the knob and the valve rod, and a horizontal push rod being disposed at the inlet of the faucet;

a connector for connecting a water supply tube and the inlet of the faucet and comprising two sections having threads on the exterior surface thereof, the interior of the two sections being separated by a hole to define a valve seat, a ball being provided to seal the hole, the ball being pushed away from the hole in the connector by the push rod in the faucet when the connector is connected to the faucet;

a quick-opening stopper connected to the outlet of the faucet comprising an outlet pipe with a flange on the top surface and a plurality of holes at the bottom thereof, an outlet cover with a central hole being provided on the upper surface of the outlet pipe, an operating lever being installed inside and through the central hole of the outlet pipe and the outlet cover, the outlet pipe and the outlet cover being held by a holder connected to the end of the outlet of the faucet and a ball for removably blocking the central hole being disposed inside the outlet of the faucet;

wherein the operating lever comprises a pushrod comprising a cylindrical rod having an oblique surface at the top portion thereof, parallel and longitudinally extending grooves being provided on the wall of the top portion, a flange being provided at the intermediate section of the rod, the rod being slightly bent below the flange, a barb being provided on one side of the rod so that when the rod is pushed up, the barb engages a surface on the outlet of the stopper to maintain the rod in an elevated position so that the ball is pushed away from the central hole in the stopper by the oblique top of the rod and when the rod is pushed horizontally, the barb is disengaged, thus permitting the rod to fall and the ball to seal the central hole.

* * * * *